United States Patent
Su et al.

(10) Patent No.: US 7,323,434 B2
(45) Date of Patent: Jan. 29, 2008

(54) ELECTROPOSITIVE PRODUCTION WELL TREATING FLUID AND METHOD OF PREPARING THE SAME

(75) Inventors: Changming Su, Beijing (CN); Rushan Liu, Beijing (CN); Weiping Xu, Beijing (CN); Zengchen Guan, Dougying (CN); Peizhi Yu, Beijing (CN); Xiushan Liu, Beijing (CN); Jiafen Li, Beijing (CN); Baoyu Guo, Dongying (CN); Yingchun Cui, Beijing (CN); Caixuan Guo, Dezhou (CN); Jing Li, Beijing (CN)

(73) Assignees: China Petroleum & Chemical Corporation, Beijing (CN); Exploration & Production Research Insitute, SINOPEC, Beijing (CN); China Petro-Chemical Corporation Shengli Petroleum Administrative Bureau, Dongying (CN)

( * ) Notice: Subject to any disclaimer, the term of this patent is extended or adjusted under 35 U.S.C. 154(b) by 402 days.

(21) Appl. No.: 10/719,235

(22) Filed: Nov. 21, 2003

(65) Prior Publication Data

US 2004/0180795 A1     Sep. 16, 2004

(30) Foreign Application Priority Data

Nov. 21, 2002 (CN) .............................. 02 1 48785
Nov. 21, 2002 (CN) .............................. 02 1 48785

(51) Int. Cl.
*C09K 8/18* (2006.01)

(52) U.S. Cl. ............... 507/111; 507/112; 507/120; 507/130; 507/140

(58) Field of Classification Search ............... None
See application file for complete search history.

(56) References Cited

U.S. PATENT DOCUMENTS

| | | | | |
|---|---|---|---|---|
| 3,342,732 A | * | 9/1967 | Goetz ................... | 210/730 |
| 3,617,568 A | * | 11/1971 | Ried, Jr. ............... | 210/727 |
| 4,507,210 A | * | 3/1985 | Lauzon ................. | 175/65 |
| 4,765,415 A | * | 8/1988 | Khalafalla et al. ..... | 175/50 |
| 4,925,247 A | * | 5/1990 | Hjelmstad ............. | 299/5 |
| 5,350,740 A | * | 9/1994 | Patel et al. ........... | 507/129 |
| 2003/0019627 A1 | * | 1/2003 | Qu et al. .............. | 166/281 |
| 2003/0114315 A1 | * | 6/2003 | Schwartz et al. ....... | 507/121 |

FOREIGN PATENT DOCUMENTS

GB         2245294 A  *  1/1992

* cited by examiner

Primary Examiner—Marc S. Zimmer
(74) Attorney, Agent, or Firm—Birch, Stewart, Kolasch & Birch, LLP.

(57) ABSTRACT

An electropositive and water-based production well treating fluid system exhibits electropositivity by using a cationic viscosifier meanwhile matched with a cationic fluid loss additive and, optionally, contains a mud-building agent, an electrical stabilizing agent, a colloid-stabilizing agent, lubricant, an oil layer protective agent and/or a weighting agent. The electropositive production well treating fluid can beffer solve the contradiction of technical requirements between "treating fluid stability" and "bore hole stability", and features a strong ability to inhibit the dispersion of clay, a good effect of protecting oil-gas reservoirs, fast drilling speeds, regular shape of bore holes and good resistance to salt.

14 Claims, No Drawings

ELECTROPOSITIVE PRODUCTION WELL TREATING FLUID AND METHOD OF PREPARING THE SAME

BACKGROUND OF THE INVENTION

1. Field of the Invention

The present invention relates to an electropositive production well treating fluid used for the operations of drilling, well completion, well pulling, and well fracturing or increasing production, and to a method of preparing the same. More particularly, the present invention relates to a drilling fluid and well completion fluid used for drilling and well completion in petroleum industry.

2. Description of the Related Art

When production well treating fluid is used as a drilling fluid in drilling a well, the production well treating fluid always is faced with a problem on how to better solve a contradiction between the "stabilization of borehole wall" and/or the protection of oil-gas reservoir and "stabilization of drilling fluid properties". Generally, a drilling fluid of an anionic system (electronegativity) is favorable for stabilizing the properties of drilling fluid itself, not for stabilizing the borehole wall and protecting the oil-gas reservoir. The electronegative clay mineral is easily swelled and dispersed into drilling fluid. Such swelling and dispersion are adverse to the stabilization of borehole wall. Alternatively, the drilling fluid system added with cationic compounds is favorable for stabilizing the borehole wall and the protecting of the oil-gas reservoir due to decreasing expansion and dispersion of electronegative clay mineral, but not for stabilizing the properties of drilling fluid itself.

For a long time, the problem of stabilizing a borehole wall, especially the problem of stabilizing a borehole wall in clay shale strata, is one of important reasons complicating downhole in drilling engineering. Especially since the 1980s, as exploration spreads towards new area areas, the strata met in drilling are increasingly complicated, the problem of borehole wall instability is increasingly serious. This sets higher requirements for borehole wall stability of drilling fluid.

Water-base drilling fluids used in current drilling process are mostly an electronegative dispersed system formed by dispersing clay particles in water, wherein the dispersion of clay particles depends on excess of negative charges presented in the crystal structure of clay particle itself. Now, during treating with the drilling fluid, treating agents used are almost all the anionic types that have very strong anion group itself. For example, in the case of dispersant and colloid-stabilizing agent and the like, the main action mechanism is namely in increasing negative charges of clay particles, intensifying hydration effect caused by negative charges and increasing the hydrated film thickness on clay particle surface to achieve the object of stabilizing colloid. Such kind of electronegative water-base drilling fluid system is undoubtedly disadvantageous for clay mineral in borehole wall and strata. This is because whatever factor is able to disperse clay particles of drilling fluid, it leads certainly to hydration, swelling and dispersion of clay mineral in the borehole wall and strata, results in losing the stability of the borehole wall and complicates cases such as slump of borehole wall and seizure of drilling tool and the like.

Therefore, in order to inhibit the dispersion of clay and stabilize the borehole wall a main measure that has to be taken generally is to add cationic substance, for example, inorganic salts of high valence metals such as iron chloride, aluminum chloride, ferric sulfate, hydroxyaluminum and the like; cationic organic substances such as cationic polyacrylamides, black organo-electropositive glues and inorgano-electropositive glues and the like into drilling fluids. They are able to neutralize negative charges of the clay surface, decrease ξ (zeta) potential of clay particles, decrease the hydrated film thickness, thus weaken the hydration effect of clay, being favorable for stabilizing borehole wall (see also U.S. Pat. Nos. 4,765,415, 4,959,164 and 5,196,401 and the like). However, these measures for stabilizing the borehole wall are disadvantageous to stabilizing the colloid of drilling fluid and cause increasing filtration loss of drilling fluid to a great extent. In order to increase colloid stabilization of drilling fluid, a great mount of an anionic stabilizer (fluid loss additive and dispersant) has to be added, but the addition of these treating agents will increase the negative charge in quantity. So drilling fluid stability and strata stability are always in contradiction to each other.

In the 1970's, there were no few of patents that recommend using an inert drilling fluid system. They utilize magnesium oxide and the like as water insoluble superfine powders to manufacture drilling fluid so as to achieve the object of no dispersion of strata clay and no pollution of production reservoir. However, it is relatively difficult to stabilize such kind of drilling fluid, as a superfine powder has to be used and also a great amount of water-soluble polymer has to be used in order to stabilize the drilling fluid through the principle of kinetics.

Before and after the 1980s, some treating agents having positive charges appear one after the other. Especially in recent years, after a mixed layered metal hydroxide compound having positive charges (i.e. an inorgano-electropositive gel or abbreviated as MMLHC) and black organo-electropositive gel are used in drilling fluid system, relatively great progresses have been made. Because such kind of electropositive gel granules and clay particles form a stable complex, by forming the complex by polarizing water molecule through particle electric field no destruction of colloid occurs in this drilling fluid system.

In order to meet the requirements of drilling engineering, improving the properties of drilling-fluid is favorable for stabilizing borehole wall and favorable for protecting oil-gas reservoir, researchers turn their attention to study cationic drilling fluid system.

China Patent CN 1144833A discloses a drilling fluid with zero electrokinetic potential. The drilling fluid is added with a charge neutralizing agent of clay in an amount of 0.1-10% by weight of the total drilling fluid, aiming to make the electrokinetic potential of drilling solids to be zero in the drilling fluid. However, in actual operation, it is very difficult to retain the electrokinetic potential of drilling solids to be zero constantly in the drilling fluid. Because the concentration of drilling solids is increased continuously with increasing drilling footage continuously in the drilling process, there is no way to determine whether the electrokinetic potential of drilling solids is zero in downhole, even if charge neutralizing agent is supplied continuously.

China Patent CN 1037852 discloses a cationic drilling fluid containing the following components: at least a macromolecule cationic polymer as a flocculating agent coated, at least a small molecule organic cationic compound as a stabilizer of clay shale, at least a viscosifier, at least a fluid loss additive and at least a alkalinity control additive. In the invention a macromolecule cationic polymer is used as a flocculating agent coated, a small molecule organic cationic compound is used as an inhibiting stabilizer of clay shale, aiming to purge drilling solids in the electronegative drilling fluid system to serve the action of increasing drilling rate and stabilizing borehole wall. The foothold of the invention still is based on the electronegative drilling fluid system, no changing occurs substantively in the drilling fluid system. Only if the flocculating agent coated and small molecule organic cationic compound are added in an amount enough high, the system can be retained to exhibit electropositivity. But such kind of electropositive system is so very unstable that the drilling requirement failures to be met.

U.S. Pat. No. 4,507,210 discloses a method of preventing swelling and dispersion of clay particles by using an optimal liquid-phase component. The inventor has found that some low swelling clay particles have "amphoteric" feature, i.e. zeta-potential of shale particles may be transformed from electronegativity to electropostivity regarding said specific clay particles under the condition of pH value higher than 12. Shale shows a cementation instability at the point near zero potential (pH value of surface charge being at the point with zero), being flocculated into greater particles, so filtration loss of the dispersed liquid phase of shale is maximized at the point of zero potential. Furthermore, the discovery has been used in drilling fluid, well completion fluid and well pulling fluid. However, the invention still is based on the electronegative drilling fluid system, and the alkalinity conditioning agent is used to adjust zeta potential of clay particles to make it higher than zero, wherein zeta potential is meant of potential of clay particles, not potential of drilling fluid. Moreover, the deficiency of the invention is that requirements for performance parameter of drilling fluid during drilling a well are not taken into account. The filtration loss of the drilling fluid entered reservoir should be controlled to the level less than 8-5 ml which is given by the standard criteria for protecting oil-gas reservoir, and pH value of drilling fluid should be kept between 7-9 (below 10). Therefore, the inventive method is very difficult to be realized for existing drilling fluid system.

Alternatively, it is known currently that the well completion fluid is still in an electronegative system and has a zeta potential in the range of −6 mv to −20 mv, which exhibits electronegativity not able to inhibit swelling and dispersion of clay in oil layer. Furthermore, the well completion fluid has different amount of solid particles with a solid-phase content generally higher than 3% by weight. When well completion fluid is contacted with oil layer, said fluid would damage the oil-gas reservoir in a certain extent because clay particles would be swelled and dispersed by electronegative system as described above. The solid particles have to cause blockage of oil layer in a certain extent and thus reduce the production of crude oil. Moreover, such well completion fluids cannot inhibit swelling and dispersion of clays in oil layer, so these result in increasing the clay content in well completion fluid and requiring for adding a great amount of water and dispersant, thus a great amount of well completion fluid is wasted and environment is polluted. Therefore, it is in great request to study and prepare a water-based well completion fluid that not only can solve the problem of solid particle blocking, but also inhibit effectively dispersion of clay and obtain a good result of protecting oil layer.

SUMMARY OF THE INVENTION

An object of the present invention is to provide a production well treating fluid which is able to overcome the defects in the prior art, make it to be a system exhibiting electropositivity from the beginning of drilling to dispose the drilling fluid. So the conditions of using clean water at initial period of drilling in the prior art or disposing bentonite mud for drilling are changed thoroughly. An electropositive treating fluid system is used to replace the electronegative treating fluid system during drilling a whole well without adding any flocculating agent or inhibitor.

An object of the present invention is either to provide a method of preparing said production well treating fluid.

Another object of the present invention is further to provide the use of said production well treating fluid as a drilling fluid and a well completion fluid in the operation of petroleum drilling and well completion.

DETAILED DESCRIPTION

The present invention provides an electropositive production well treating fluid, wherein a cationic viscosifier is used, meanwhile matched with a cationic fluid loss additive, and optionally matched with an electropositive mud-building agent for the production well treating fluid, and/or an electrical stabilizing agent, and/or a colloid-stabilizing agent, and/or a lubricant, and/or oil layer protective agent, and/or weighting agent, to make the treating fluid system exhibiting an electropositivity. This electropositive treating fluid can solve better the contradiction between "treating fluid stability" and "borehole wall stability" to realize really combining both "drilling fluid" and "well completion fluid" into one. The electropositive production well treating fluid of the present invention has features in strong ability of inhibiting the dispersion of clay, good effect of protecting oil-gas reservoir, high drilling speed, regular shape of bore hole, good resistance to salt and low environmental pollution and the like.

Said "electropositive production well treating fluid" in the present invention refers to a water-based treating fluid system dispersed under positive electricity state, which has a positive value of zeta potential. The term "electropositive production well treating fluid" involves drilling fluid, well completion fluid and well pulling fluid, in particular, involves perforating fluid, well-flushing fluid, breakdown fluid, spacing fluid or gravel-packing fluid. However, conventional treating fluid systems used currently exhibit electronegativity (zeta potential is of −50 to −20 mv).

In the first embodiment of the present invention, an electropositive production well treating fluid is provided, which contains:
 a) at least a cationic fluid loss additive with a content of 0.05-5% by weight;
 b) at least a cationic viscosifier with a content of 0,05-5% by weight;
 The contents above are both based on total weight of the production well treating fluid; and the balance is water.

In another embodiment, said production well treating fluid of the present invention may contain further an electropositive mud-building agent for the production well treating fluid with a content of 0.5-6% by weight.

In further a embodiment, said production well treating fluid of the present invention may contain further an electrical stabilizing agent with a content of 0.1-15% by weight.

In the other embodiment, said production well treating fluid of the present invention may further contain at least an additive selected from the group consisting of colloid-stabilizing agent, lubricant, oil layer protective agent or weighting agent.

More specifically, in a preferred embodiment, said production well treating fluid of the present invention may also contain further:
 c). electropositive mud-building agent for the production well treating fluid;
 d). electrical stabilizing agent;

e). colloid-stabilizing agent;
f). lubricant;
g). oil layer protective agent; and
h). weighting agent.

The above lubricant, oil layer protective agent and weighting agent may be either the known commercial products in the art, or other non-onic materials and inert materials. Lubricant is preferably selected from the group consisting of mineral oils, lubricant comprising cationic surfactant, vegetable oils and solid lubricants the like. Oil layer protective agent is preferably selected from the group consisting of superfine calcium carbonate, oil-soluble resin, fibre blocking agent and the like. Weighting agent is preferably selected from the group consisting of salts of heavy metal barite, ilmenite, limestone and the like.

In the production well treating fluid of the present invention, said fluid loss additive preferably is at least one selected from the group consisting of cationic polymer with a low molecular weight, cationic starch, cationic modified cellulose, cationic lignin and cationic modified lignite.

In the production well treating fluid of the present invention, said viscosifier is preferably at least one selected from the group consisting of inorgano-electropositive gel, black organo-electropositive gel, cationic guanidine gel, cationic polyacrylamide and polyquatemary amine salt.

In production well treating fluid of the present invention, said electropositive mud-building agent for the production well treating fluid is preferably selected from the group consisting of clay mineral which has a zeta potential higher than −10 mv or a modified product of said clay mineral. Said modified product has a zeta potential higher than or equal to zero.

In the production well treating fluid of the present invention, said electrical stabilizing agent is preferably at least one selected from the group consisting of an inorganic salt of iron or aluminum, such as iron chloride, aluminum chloride, ferric sulfate, aluminum sulfate, hydroxyaluminum and organic cationic etherifying agent.

In addition, in the production well treating fluid of the present invention, said colloid-stabilizing agent is preferably selected from the group consisting of hydroxyethyl cellulose, hydroxypropyl cellulose, biopolymer, polymeric alcohol and polysaccharide.

In addition, said production well treating fluid of the present invention has a zeta potential higher than 0 mv, preferably higher that +10 mv more preferably in the range of +10 mv to +60 mv.

Conventional drilling fluids have a zeta potential generally in the range of −50 mv to −20 mv. In the construction process, the drilling fluid leads to dispersing clay, increasing the viscosity of drilling fluid and having too high content of clay, such that a great amount of dispersant and water is required to add in order to stabilize drilling fluid properties. Thus a large amount of drilling fluid is discharged and environment is polluted, meanwhile causing the instability of borehole wall. Therefore, it is very difficult to be used suitably for the construction of strong water-sensitive oil-gas field.

Without intending to be bounded by any theory, the inventor believed that the cationic polymer component in the electropositive production well treating fluid according to the present invention can neutralize the negative charges of clay mineral at relatively high speed and with a relatively strong electrostatic force because the component bears a positive charge, and has strong neutralizing ability, a longer polymer chain and good bridging action. Also, the cationic polymer component can reduce greatly the specific surface area and negative charge of clay by lying singly on the surface of clay in a form of mono-molecule layer, thereby making the water-sensitivity of clay lost essentially and thus serving the function of stabilizing clay, and stabilizing effectively the borehole wall to realize the object of protecting oil-gas reservoir. However, the inorgano-electropositive gel and organo-electropositive gel and the like having a smaller molecular weight can further enter the space of crystal layers of clay sheet to form permanent adsorption, exerting even better ability of inhibiting hydration, swelling, dispersion and migration of clay shale, and thus forming a stable complex with clay particles to make no destruction of colloid occurred in the treating fluid system. So the stabilization of the treating fluid itself can be ensured. Therefore, the electropositive production well treating fluid of the present invention solves better the contradiction between "treating fluid stability" and "borehole wall stability". The electropositive production well treating fluid has advantages in strong ability of inhibiting the dispersion of clay (the ability of inhibiting dispersion of clay up to 90% above); high drilling speed (increasing the drilling speed more than 10%); regular shape of bore hole (the enlarging rate of well diameter less than 15%); good resistance to salt; good effect of protecting oil-gas reservoir (recovery rate of permeability higher than 80%); small amount of the drilling fluid disused; and thus favorable to environmental protection. So it is suitable to use in the construction of a strong water-sensitive and complicated oil-gas field. It has a widespread use in operations such as drilling, well completion, well fracture, increasing production and well-flooding and the like.

In tests of the electropositive production well treating fluid of the present invention in the drilling of oil field and the protection of oil-gas reservoir, results show that drilling speed can be increased more than 40%, compared to the conventional electronegative drilling fluid system used currently. The dispersion of clay in oil layer is inhibited effectively, the oil layer is protected better and the recovery value of permeability of oil layer is increased more than 40%.

Specific Embodiment Mode of Invention

The following examples are intended only to illustrate the present invention, should not be intended to limit scope of the present invention. The reagents used therein, unless those indicated explicitly, are any kind of commercial reagents sold on the market, and said percentages are all by weight based on a total weight of the composition, unless those indicated explicitly.

EXAMPLE 1

The electropositive drilling fluid without solid phase, perforating fluid, well-flushing fluid, breakdown fluid, spacing fluid or gravel-packing fluid were prepared by using components as follows:
1% cationic polyacrylamide (CPAM),
2% cationic starch (NCP), and
The balance was water.
Wherein an aqueous composition was obtained by adding cationic polyacrylamide, cationic starch and water to a reactor at room temperature(25° C.) and stirring fully.

EXAMPLE 2

By adding 0.5% aluminum chloride as electrical stabilizing agent to the formulation of Example 1 and using the same method as in Example 1, an electropositive drilling fluid without solid phase, perforating fluid, well-flushing fluid, breakdown fluid, spacing fluid or gravel-packing fluid was prepared.

EXAMPLE 3

By adding 0.3% xanthan gum as colloid-stabilizing agent to the formulation of Example 2 and using the same method as in Example 1, the electropositive drilling fluid without solid phase, perforating fluid, well-flushing fluid, breakdown fluid, spacing fluid or gravel-packing fluid was prepared.

EXAMPLE 4

An electropositive drilling fluid containing solid phase was prepared by using the same method as in Example 1 with the components as follows:
0.3% cationic polyacrylamide (CPAM),
1% cationic starch (NCP),
3% cationic modified clay, and
The balance was water.

EXAMPLE 5

By adding 2% modified vegetable oil as lubricant to the formulation of Example 3 and using the same method as in Example 1, an electropositive drilling fluid without solid phase was prepared.

EXAMPLE 6

By adding 1% oil-soluble resin and 3% superfine calcium carbonate as oil layer protective agent to the formulation of Example 5 and using the same method as in Example 1, an electropositive drilling fluid containing solid phase and/or spacing fluid were/was prepared.

EXAMPLE 7

By adding 3% barite as weighting agent to the formulation of Example 6 and using the same method as in Example 1, an electropositive drilling fluid containing solid phase was prepared.

EXAMPLE 8

By adding 3% black organo-electropositive gel (produced by Shenli Oil Field Drilling-mud Company, China) to the formulation of Example 1 as electrical stabilizing agent and using the same method as in Example 1, an electropositive drilling fluid without solid phase, perforating fluid, well-flushing fluid, breakdown fluid, spacing fluid or gravel-packing fluid was prepared.

EXAMPLE 9

By adding 1% graphite as solid lubricant to the formulation of Example 8 and using the same method as in Example 1, an electropositive drilling fluid containing solid phase was prepared.

EXAMPLE 10

By adding 1% oil-soluble resin and 2% fiber blocking agent as oil layer protective agent to the formulation of Example 9 and using the same method as in Example 1, an electropositive drilling fluid containing solid phase was prepared.

EXAMPLE 11

By adding 0.3% hydroxyethyl cellulose as colloid-stabilizing agent and adding 1% graphite as solid lubricant to the formulation of Example 4 and using the same method as in Example 1, an electropositive drilling fluid containing solid phase was prepared.

EXAMPLE 12

By adding 1% oil-soluble resin and 2% fiber blocking agent as oil layer protective agent to the formulation of Example 11 and using the same method as in Example 1, an electropositive drilling fluid containing solid phase was prepared.

EXAMPLE 13

By adding 5% $ZnBr_2$ as weighting agent to the formulation of Example 12 and using the same method as in Example 1, an electropositive drilling fluid containing solid phase was prepared.

EXAMPLE 14

An electropositive drilling fluid containing solid phase was prepared by using the same method as in Example 1 with the components as follows:
0.1% cationic etherifying agent,
0.1% cationic polyacrylamide,
0.5% inorgano-electropositive gel,
1% polymeric alcohol,
2% cationic starch,
2% electropositive mud-building agent for production well treating fluid, and the balance was water.

EXAMPLE 15

An electropositive drilling fluid containing solid phase was prepared by using the same method as in Example 1 with the components as follows:
0.5% polyquaternary ammonium salt,
0.1% cationic polyacrylamide,
0.5% inorgano-electropositive gel,
2% polymeric alcohol,
2% cationic starch,
2% electropositive mud-building agent for production well treating fluid,
0.5% hydroxyethyl cellulose,
3% superfine calcium carbonate, and
the balance was water.

EXAMPLE 16

An electropositive drilling fluid containing solid phase, perforating fluid, well-flushing fluid, breakdown fluid, spacing fluid, acidification fluid or gravel-packing fluid was prepared by using components as follows and the same method as in Example 1:
0.1% polyquaternary ammonium salt,
3% black organo-electropositive gel,
2% polymeric alcohol,
2% cationic starch, 0.5% hydroxyethyl cellulose,
3% superfine calcium carbonate,
1% oil-soluble resin, and the balance was water.

COMPARATIVE EXAMPLE 1

A conventional electronegative drilling fluid system was prepared by using the following components and the same method as in Example 1:
5% bentonite,
0.2% partially hydrolyzed polyacrylamide,
1% hydrolyzed polyacrylonitrile ammonium salt,
2% sulfonated phenolic resin, and
The balance was water.

COMPARATIVE EXAMPLE 2

A conventional perforating fluid, well-flushing fluid, breakdown fluid, spacing fluid, acidification fluid or gravel-packing fluid was prepared by using components as follows and the same method as in Example 1:
0.5% partially hydrolyzed polyacrylamide,
2% modified starch,
2% inorganic-electropositive gel,
3% superfine calcium carbonate,
2% hydrolyzed polyacrylonitrile animonium salt, and the balance was water.

The comparison of each property of said drilling fluid and well completion fluid in Examples and Comparative Examples are shown in Table 1 and Table 2 below.

Zeta potential was measured by using ZETA-READER instrument (Made in USA) according to the following procedures:

1. The sodium clay was used as carrier for evaluating electrical polarity of drilling fluid and well completion fluid.

The function of sodium clay is similar to pH indicator paper for testing acid salt tolerance of drilling fluid. The sodium clay slurry in concentration of 3wt % is prepared by adding distilled water and further hydrated for a period of at least 24 hours prior to carrying out the test.

2. Controlling of the time for ion-exchange and absorption.

The absorbent speed of clay particles with solute in the solution is relatively slow. Main factor influencing said absorbent speed is the size of solute molecule. It is necessary for solute to pass through the layer of liquid on the surface of solid particle so as to being absorbed. Larger of size of solute molecule, slower of the speed of diffusion, slower of the speed of being incorporated into and absorbed on the surface of solid particle as well. Furthermore, absorbent speed is in relation with the viscosity of solution. Higher of viscosity of solution, slower of diffusion speed of solute molecule. Thus, it is very important in the research of electropositive drilling liquid for the feature of solid-liquid absorbent speed being slower. The results show that the ion-exchange speed between inorganic salts with clay particles is much faster, and thus the exchange would be completed within two hours. The absorbent speed between cationic polymer materials with clay particles is slower, and results show that it takes about six hours for cationic starch to achieve stabilization of electrical polarity. The time for ion-exchanging and absorption should be controlled within 24 hours due to complex structures of solid particles and liquid and hence many factors influencing said time. It is necessary to being absorbed sufficiently by clay particles in order to ensure the exactness of tests.

3. Measurements of electrical polarity.
a. Drilling fluid containing sodium clay.
5 ml slurry was pumped with a syringe and added into 100 ml distilled water after the absorbent time of sodium clay particles beyond 24 hours. Zeta potential was measured at ambient temperature and atmosphere after stirring 1 minute using ZETA-READER instrument.

b. Drilling fluid without sodium clay.
Such drilling fluids are mainly the fluids formulating by kaolin, sepiolite and asbestos fiber and the like. In order to evaluating electrical polarity, sodium clay slurry in concentration of 3 wt % prepared in step 1 was added into such drilling fluids in a volume ratio of 2% (content of sodium clay is 0.06% now). 5 ml slurry was pumped with a syringe and added into 100 ml distilled water after 24 hours. Zeta potential was measured at ambient temperature and atmosphere after stirring 1 minute using ZETA-READER instrument.

c. Drilling fluid and well completion fluid without solid phase.

Sodium clay slurry in concentration of 3 wt % prepared in step 1 was added into such fluids in a volume ratio of 2% (content of sodium clay is 0.06% now). 5 ml slurry was pumped with a syringe and added into 100 ml distilled water after 24. hours. Zeta potential was measured at ambient temperature and atmosphere after stirring 1 minute using ZETA-READER instrument.

Content of clay of diameter less than 2 μm was measured by using SALD-1100 Mode Laser Particle Size instrument. And values of parameters $\phi 600$, $\phi 300$, Recovery value of permeability and Shale recovery were measured under the Drilling Fluid Testing Criterion issued by Department of Petroleum.

TABLE 1

| Types of drilling fluid and well completion fluid | Performance parameter | | | | |
|---|---|---|---|---|---|
| | Density (g/cm$^3$) | pH | Φ 600 | Φ 300 | Zeta Potential (mv) |
| Example 1 | 1.0 | 7.0 | 36 | 27 | 21 |
| Example 2 | 1.01 | 7.0 | 37 | 26 | 29.2 |
| Example 3 | 1.01 | 7.0 | 48 | 38 | 28.6 |
| Example 4 | 1.03 | 7.5 | 37 | 28 | 23.5 |
| Example 5 | 1.01 | 7.0 | 42 | 31 | 27.5 |
| Example 6 | 1.10 | 7.0 | 45 | 34 | 25 |
| Example 7 | 1.0 | 7.0 | 49 | 38 | 24.7 |
| Example 8 | 1.0 | 7.0 | 33 | 21 | 29.2 |
| Example 9 | 1.0 | 8.0 | 33 | 22 | 28.9 |
| Example 10 | 1.01 | 8.0 | 36 | 28 | 28.2 |
| Example 11 | 1.0 | 8.0 | 39 | 27 | 19.4 |
| Example 12 | 1.01 | 8.0 | 41 | 30 | 20.4 |
| Example 13 | 1.20 | 7.0 | 38 | 29 | 26.6 |
| Example 14 | 1.02 | 7.5 | 43 | 32 | 28 |
| Example 15 | 1.06 | 7.0 | 41 | 30 | 25 |
| Example 16 | 1.03 | 7.5 | 35 | 24 | 29 |
| Comparative Example 1 | 1.04 | 10 | 38 | 26 | −35 |
| Comparative Example 2 | 1.02 | 8 | 18 | 8 | −6.5 |

TABLE 2

| Types of drilling fluid and well completion fluid | Performance parameter | | |
|---|---|---|---|
| | Recovery value of permeability (%) | Shale recovery (%) | Content of clay of diameter less than 2 μm, (%) |
| Example 1 | 86.2 | 89 | 4.5 |
| Example 2 | 89.0 | 92 | 4.0 |
| Example 3 | 88.7 | 91 | 3.8 |
| Example 8 | 90.2 | 93 | 3.0 |
| Example 9 | 92.2 | 95 | 2.7 |
| Example 10 | 93.0 | 97 | 1.3 |
| Comparative Example 2 | 54.9 | 65 | 30 |

From the field tests carried out with said production well treating fluid in aforesaid Example 1 and Comparative Examples, it can be seen that the electropositive production well treating fluid of the present invention has very strong inhibiting ability. From analyze of rock fragments returned out from the well, the rock fragments are essentially non-dispersed, and has clear edges and corners. Enlarging ratio of well diameter is in an average of 5%, as compared with the application tests of Comparative Examples, the enlarging ratio of well diameter is decreased by 3 times, and drilling speed is increased by 45%.

In summarizing the aforesaid results of Examples and field experiments, said electropositive production well treating fluids of the present invention have advantages as follows:

1. Realizing the transformation from negative potential to positive potential for the zeta potential of the production well treating fluid, the treating fluid colloid being stable.
2. Strong ability of inhibiting clay mineral and borehole being stable.
3. Favorable for increasing drilling speed, reducing time for well construction, decreasing numbers of drill bit used and having low cost for well drilling.
4. Favorable for protecting oil-gas reservoir and increasing crude oil production.
5. Strong resistance to pollution of inorganic salt, especially suitable to use for salt cream layer and/or salt-water layer in the drilling construction.
6. In drilling process, having no need of adding thinner, discharging drilling fluid in a small amount, and favorable for environmental protection.

It should be understand for one skilled in the art that the examples and embodiments in the specification are only of representatives. The embodiment modes of Examples may be changed or modified without departing from the teachings disclosed in the present application, including, but not limited to, those modifications proposed in the present specification. Therefore, when the scope of the present invention is judged, the attached claims as the followings should be referred.

The priority applications corresponding to the present application such as CN 02148786.3 and CN 02148785.5 are incorporated entirely into the present application as references.

The invention claimed is:

1. An electropositive production well treating fluid, comprising:
    at least one cationic fluid loss additive with a content of 0.05-5% by weight;
    at least one cationic viseosifler with a content of 0.05-5% by weight;
    an electrical stabilizing agent with a content of 0.1-15% by weight;
    a mud-building agent with a content of 0.5-6% by weight; the contents above are based on total weight of the production well treating fluid;
    and water,
    wherein said electrical stabilizing agent is at least one selected from the group consisting of an inorganic salt of iron, an inorganic salt of aluminum, hydroxylaluminum and an organic cationic etherifying agent.

2. The production well treating fluid according to claim 1, which further comprises at least one additive selected from the group consisting of a colloid-stabilizing agent, a lubricant, an oil layer protective agent and a weighting agent.

3. The production well treating fluid according to claim 1, which further comprises:
    a colloid-stabilizing agent;
    a lubricant;
    an oil layer protective agent; and
    a weighting agent.

4. The production well treating fluid according to claim 1, wherein said cationic fluid loss additive is at least one selected from the group consisting of a cationic starch, a cationic modified cellulose, a cationic lignin and a cationic modified lignite.

5. The production well treating fluid according to claim 1, wherein said cationic viscosifler is at least one selected from the group consisting of an inorgano-electropostive gel, a black organo-electropositive gel, a cationic guanidine gel, a cationic polyacrylamide and a polyquaternary ammonium salt.

6. The production well treating fluid according to claim 1, wherein said mud-building agent is at least one selected from the group consisfing of a clay mineral which has a zeta potential higher than −10 mv and a modified product of said clay mineral.

7. The production well treating fluid according to claim 1, which further comprises at least one colloid-stabilizing agent with a content of 0.05-5% by weight.

8. The production well treating fluid according to claim 7, wherein said colloid-stabilizing agent is at least one selected from the group consisting of a hydroxyethyl cellulose, a biopolymer, a polymeric alcohol and a polysaccharide.

9. The production well treating fluid according to claim 1, which has a zeta potential higher than 0 mv.

10. The production well treating fluid according to claim 1, which has a zeta potential in the range of +10 mv to +60 mv.

11. The production well treating fluid according to claim 1, which has a zeta potential in the range of +21 mv to +29 mv.

12. A method of preparing a production well treating fluid according to claim 1, which comprises:
    mixing at least one cationic fluid loss additive, at least one cationic vicosifier, water, an electrical stabilizing agent, a mud building agent, and optionally adding at least one selected from the group consisting of a colloid-stabilizing agent, a lubricant, an oil layer protective agent, and a weighting agent;
    wherein the content of the cationic fluid loss additive is 0.05-5% by weight; the content of the cationic viscosifier is 0.05-5% by weight and the content of the electrical stabilizing agent is 0.1-15% by weight;
    said contents are all based on total weight of the production well treating fluid,
    and wherein said electrical stabilizing agent is at least one selected from the group consisting of an inorganic salt of iron, an inorganic salt of aluminum, hydroxyaluminum and an organic cationic etherifying agent.

13. A process of drilling and well completion, comprising:
    applying the well treating fluid of claim 1 as a drilling fluid during a drilling or well completion operation.

14. The production well treating fluid according to claim 1, wherein said inorganic salt of iron is iron chloride or ferric sulfate, and said inorganic salt of aluminum is aluminum chloride or aluminum sulfate.

* * * * *